No. 755,146. PATENTED MAR. 22, 1904.
A. I. LINSLEY.
NUT LOCK.
APPLICATION FILED FEB. 2, 1904.
NO MODEL.
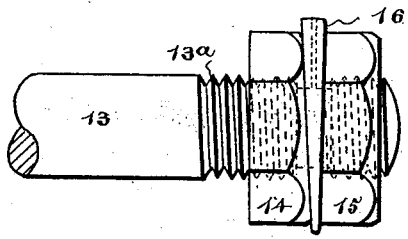
Fig. 1.
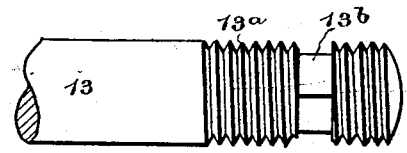
Fig. 2.
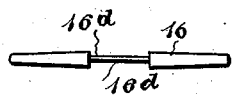
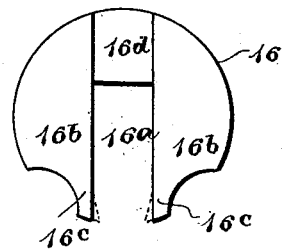
Fig. 3.
Fig. 4.
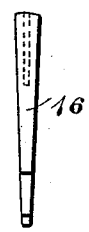
Fig. 5.
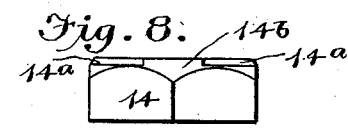
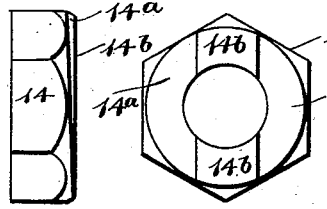
Fig. 7. Fig. 6.
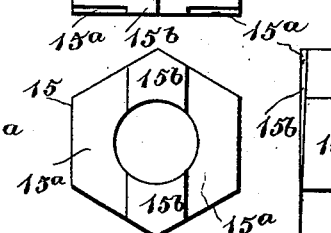
Fig. 9. Fig. 10.
Witnesses
F. A. Parron.
M. A. Schmidt
Albert I. Linsley Inventor
by
Milo B. Stevens & C.
Attorneys
THE NORRIS PETERS CO., PHOTO-LITHO., WASHINGTON, D. C.

No. 755,146. Patented March 22, 1904.

UNITED STATES PATENT OFFICE.

ALBERT I. LINSLEY, OF BEDFORD, OHIO.

NUT-LOCK.

SPECIFICATION forming part of Letters Patent No. 755,146, dated March 22, 1904.

Application filed February 2, 1904. Serial No. 191,656. (No model.)

*To all whom it may concern:*

Be it known that I, ALBERT I. LINSLEY, a citizen of the United States, residing at Bedford, in the county of Cuyahoga and State of Ohio, have invented new and useful Improvements in Nut-Locks, of which the following is a specification.

My invention relates to improvements in nut-locks, and has for its object a simple and efficient device of this kind.

Improved details in the construction and arrangement of the various parts of the invention will be apparent from the following description and claims when read in connection with the appended drawings, in which—

Figure 1 is a side elevation showing the application of the nut-lock. Fig. 2 is an elevation of the bolt. Fig. 3 is a plan view of the locking washer or key. Figs. 4 and 5 are edge views thereof. Fig. 6 is a plan view of one of the nuts. Figs. 7 and 8 are edge views thereof. Fig. 9 is a bottom plan view of the other nut. Figs. 10 and 11 are edge views thereof.

Referring specifically to the drawings, 13 indicates a bolt having threads $13^a$, some of which are cut away to square the bolt, as at $13^b$, for a purpose to be hereinafter described. At 14 is indicated a nut the face of which is cut away on opposite sides, as at $14^a$, forming a ridge or projection $14^b$ across the face of the nut. The other nut is indicated at 15, and its base is cut away at $15^a$ in the same manner as the face of the nut 14, forming a ridge or projection $15^b$ across the base. The cuts $14^a$ and $15^a$ are inclined in opposite directions, and when both nuts are placed on the bolt so that the cuts are opposite to each other they form a tapering or wedge-shaped space on both sides of the ridges $14^b$ and $15^b$.

The locking washer or key is shown at 16. It has an opening $16^a$, forming wings $16^b$, the lower ends of which are reduced in width, as at $16^c$. In line with the opening $16^a$ a groove $16^d$ is formed in both sides of the washer, which groove extends to the outer edge thereof. The width of the opening and grooves in the washer and the ridges on the nuts is substantially the same as the diameter of the squared part of the bolt, so that when the nuts are screwed on the bolt and the washer is placed between them over the squared part of the bolt, as shown in Fig. 1, the wings $16^b$ will project into the wedge-shaped spaces between the nuts, and the ends of the ridges on the nut will extend into the grooves $16^d$ in the washer. The nuts are thus securely locked together and as the washer is prevented from turning by the squared part of the bolt the nut cannot come off the bolt.

As shown in Figs. 4 and 5, the wings of the washer 16 are wedge-shaped, so that they can be tightly jammed between the nuts, and to further secure the washer the wings can be hammered over against the nut, as shown by dotted lines in Fig. 3.

Having thus described my invention, what is claimed as new, and desired to be secured by Letters Patent, is—

1. A nut-lock comprising superposed nuts, a washer therebetween having a groove on both sides, a projection on the nuts extending into said grooves, and means for preventing rotation of the washer.

2. A nut-lock comprising superposed nuts, a washer therebetween having grooves on both sides and wedge-shaped wings extending between the nuts, a projection on the nuts extending into the grooves, and means for preventing rotation of the washer.

In testimony whereof I have signed my name to this specification in the presence of two subscribing witnesses.

ALBERT I. LINSLEY.

Witnesses:
LOTTIE NEWBURN,
JOHN A. BOMMHARDT.